United States Patent [19]

Thacker

[11] 4,088,235

[45] May 9, 1978

[54] DEMOUNTABLE RAMP STRUCTURE FOR DUMP TRUCKS AND SIMILAR VEHICLES

[76] Inventor: Howard E. Thacker, 41875 Osgood Rd., Fremont, Calif. 94538

[21] Appl. No.: 708,018

[22] Filed: Jul. 23, 1976

[51] Int. Cl.² .............................................. B65G 67/02
[52] U.S. Cl. ...................................... 214/85; 14/71.1
[58] Field of Search ............... 214/85, 85.1, 505, 650, 214/620–621, 75 R, 75 T, 450, 13–14; 14/71.1, 72.5, 69.5; 296/61

[56] References Cited

U.S. PATENT DOCUMENTS

| | | | |
|---|---|---|---|
| 1,103,155 | 7/1914 | Niswanger | 14/69.5 |
| 1,673,740 | 6/1928 | Eide | 214/85 |
| 3,153,489 | 10/1964 | Leavengood et al. | 214/85 |
| 3,255,902 | 6/1966 | Welton | 214/85 |
| 3,296,639 | 1/1967 | Pawlus | 14/71.1 |
| 3,352,440 | 11/1967 | Wilson | 214/85 |
| 3,511,393 | 5/1970 | Abromavage et al. | 14/71.1 |
| 3,517,791 | 6/1970 | Miles | 214/85 |
| 3,735,440 | 5/1973 | Hetmanski | 14/71.1 |
| 3,834,565 | 9/1974 | Goodman, Jr. et al. | 296/61 |

*Primary Examiner*—Drayton E. Hoffman
*Assistant Examiner*—Lawrence E. Williams
*Attorney, Agent, or Firm*—Thomas Schneck, Jr.

[57] ABSTRACT

A ramp wherein a rigid framework supports a first pair of parallel ramp members of equal length to be mounted from the rear of a truck bed downwardly at an angle, clearing the ground. A second pair of ramp members is hinged to the first pair of ramp members and is folded over first pair when the ramp structure is not in use but is brought into substantially parallel alignment therewith when said ramp is used for loading purposes.

11 Claims, 9 Drawing Figures

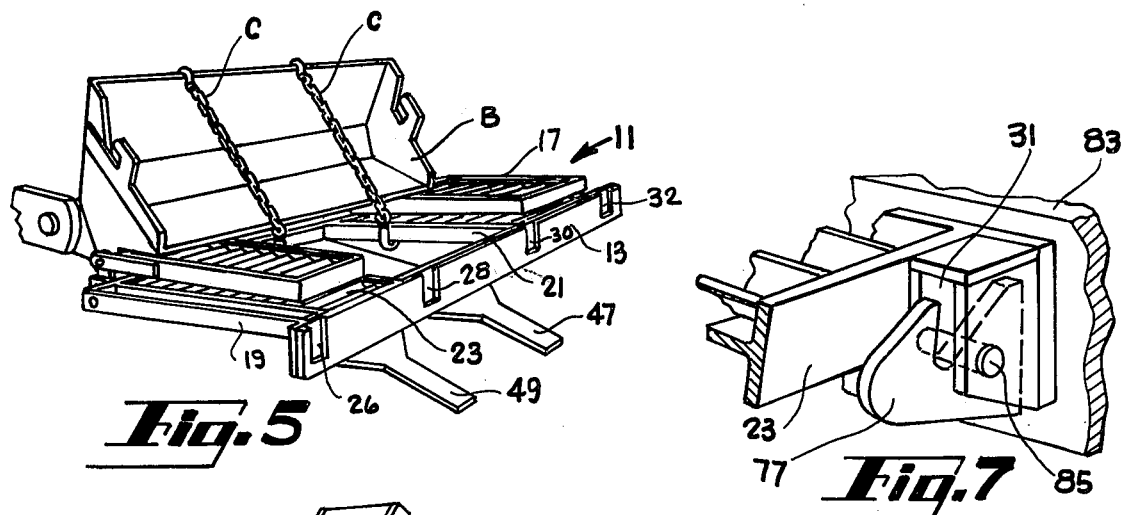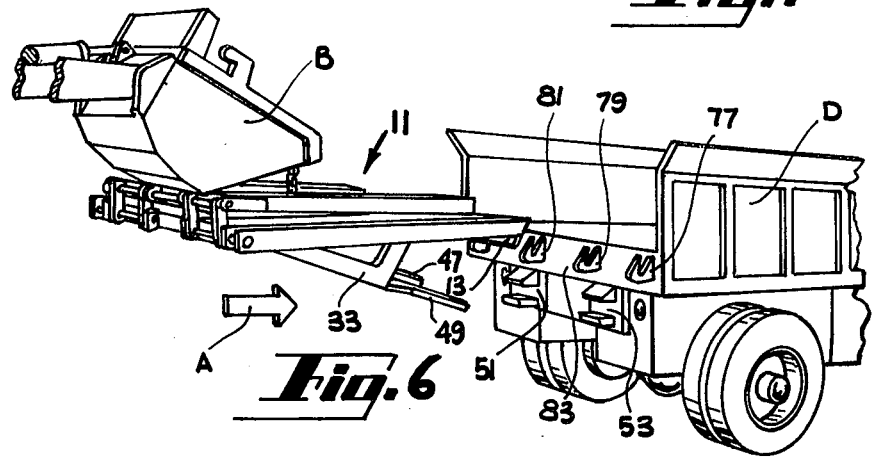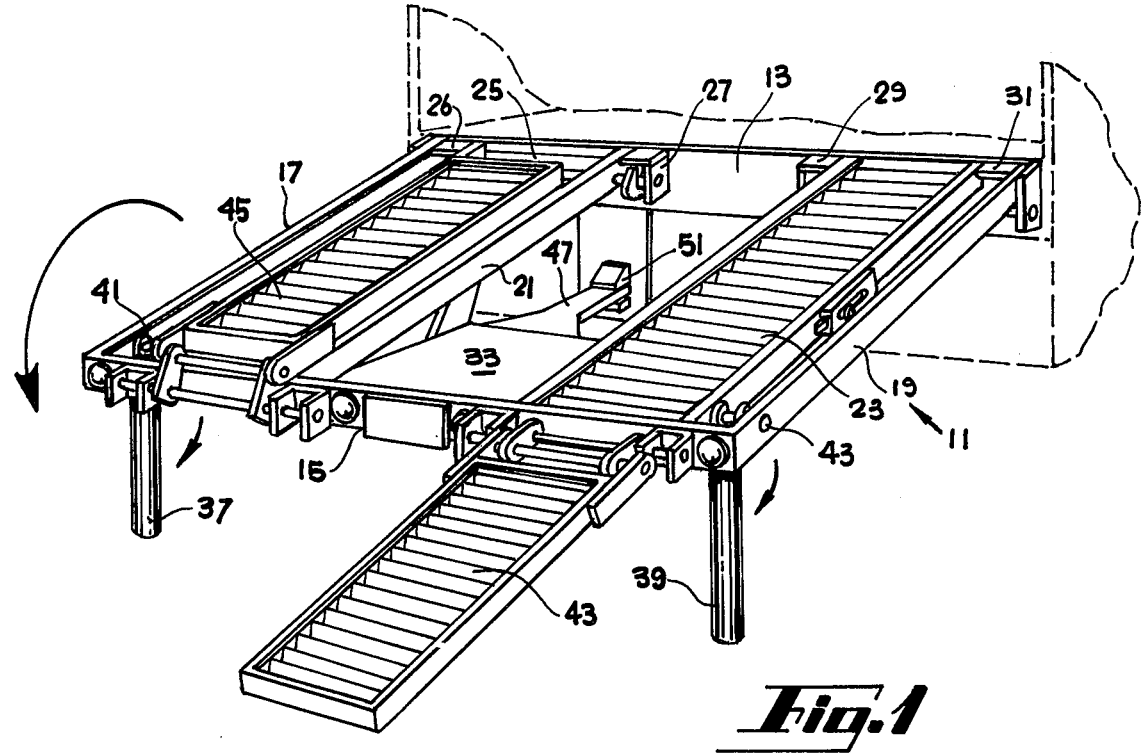

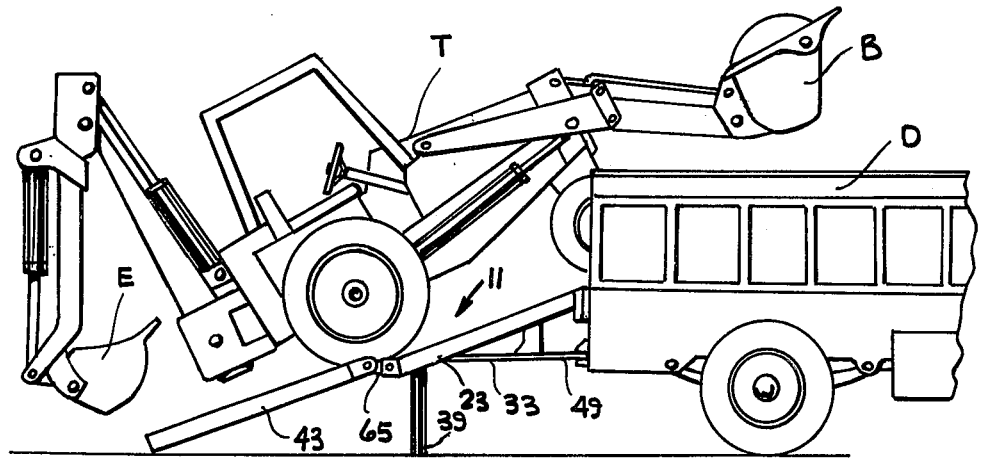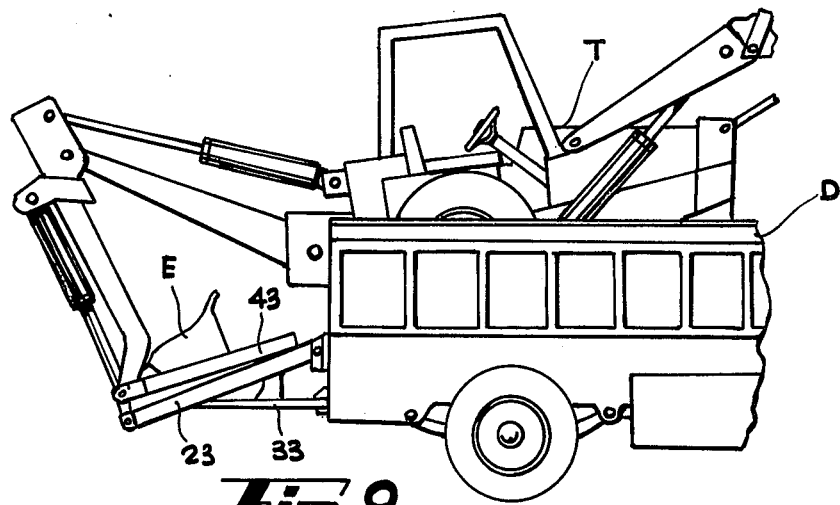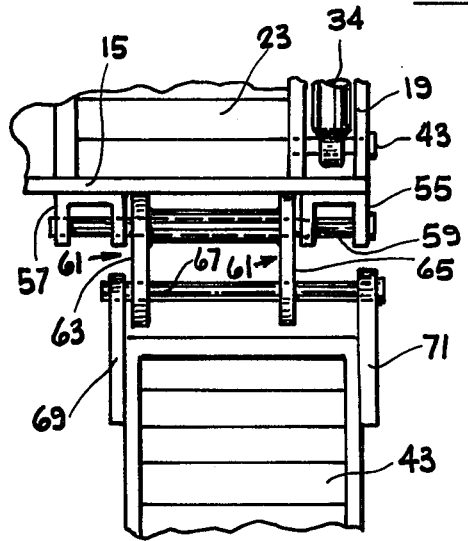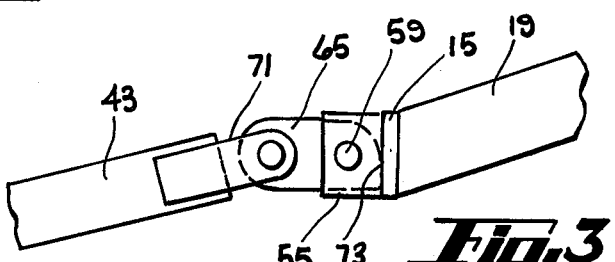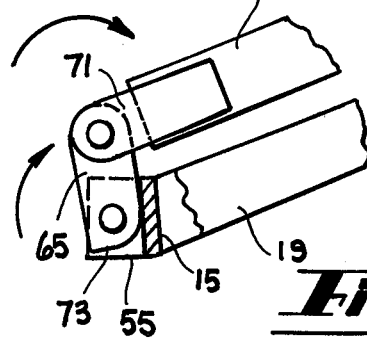

DEMOUNTABLE RAMP STRUCTURE FOR DUMP TRUCKS AND SIMILAR VEHICLES

BACKGROUND OF THE INVENTION

1. Field of the Invention

The apparatus relates generally to material handling apparatus and more particularly to ramps for loading land vehicles onto other land vehicles.

2. Prior Art

The best known loading apparatus for flat bed trucks and the like is the so-called beaver tail ramp shown in U.S. Pat. No. 2,966,274. An alternate folding ramp construction for flat bed trucks is shown in U.S. Pat. No. 3,834,565. These patents addressed the problem of loading construction equipment such as tractors and back hoes on flat bed trucks for transportation between job sites.

While beaver tail type ramps have solved some problems in providing loading apparatus for construction equipment, a problem still exists in loading construction vehicles onto other vehicles where a beaver tail would inhibit the operation of the other vehicle.

For example, in many construction projects dump trucks and the like are used to haul away debris and earth. It is common in these projects to use loaders, back hoes, or tractors with loader and back hoe attachments for the purpose of working with a dump truck. Presently, it is the practice to transport a tractor with earth-moving attachments or a loader or other auxiliary vehicle on a trailer. Alternatively, the auxiliary vehicle could be loaded on a special flat bed truck designed for carrying such auxiliary vehicles.

It is an object of my invention to devise a ramp structure for use with dump trucks and the like such that auxiliary vehicles may be loaded on the dump truck, yet the ramp is demountable from the dump truck such that a ramp will not interfere with the operation of the dump truck. This obviates the need for trailers or special carrier trucks.

Previously, others have devised demountable ramps of various types for loading auxiliary vehicles on flat bed trucks. For example, U.S. Pat. No. 2,705,081 shows folding ramps which may be tucked beneath the bed of a truck.

U.S. Pat. No. 3,642,156 shows a ramp using telescoping ramp members which may be folded against the tailgate of a pickup type truck. Yet other ramps intended for use in loading vehicles onto flat bed trucks are shown in U.S. Pat. Nos. 3,517,791; 3,510,015; 3,756,440; 3,550,801.

None of the ramps of the prior art is intended for use in loading construction vehicles on dump trucks and the like where it is important to have unobstructed clearance of the rear portion of the truck bed when the ramp is not in use.

My object has been to devise ramp for dump trucks and similar flat bed vehicles for loading auxiliary construction vehicles thereon such that the rear of the truck bed is unobstructed when the ramp is not in use.

SUMMARY OF THE INVENTION

The above object is achieved in a demountable ramp structure for dump trucks and similar trucks having beds of a size for hauling auxiliary vehicles wherein the ramp is built of at least two parallel ramp members secured within a rigid framework. The rigid framework is adapted to be picked up as a unit, for example by the auxiliary vehicle, and attached to the rear of the truck bed. The framework includes a second pair of parallel ramp members hinged to the framework so that they fold over the first pair of ramp members when the framework is stored, either by itself or on the back of a truck and which may be extended by unfolding the ramp members to the point where they reach the ground and are parallel to the first pair of ramp members such that a construction vehicle may travel up the ramp onto the bed of a truck.

The framework further includes a means for coupling the framework to a truck body and a means for bracing the framework both against the truck body, as well as against the ground when the ramp is in use.

A rigid panel extends from the rear side of the framework at an angle to the lateral sides of the frame and is centrally disposed between ramp members. The panel serves to stiffen the position of the framework by providing part of the bracing of the framework against the truck body, as well as serving as a platform for carrying the bucket of a back hoe, when the back hoe is carried on the bed of dump truck or the like to which the framework is coupled.

The invention will be more clearly understood with reference to the following figures.

BRIEF DESCRIPTION OF THE DRAWINGS

FIG. 1 is a perspective view of the ramp structure of the present invention.

FIG. 2 is a top view of a detail showing the hinged connection of members of the first and second pairs of ramp members.

FIG. 3 is a simplified side view of the hinging arrangement shown in FIG. 2.

FIG. 4 is a simplified side view of hinge motion of the apparatus shown in FIG. 3.

FIG. 5 is a perspective view of a loader bucket picking up the apparatus of the present invention.

FIG. 6 shows a loader bucket attaching the ramp structure of the present invention to the rear bed portion of a dump truck.

FIG. 7 is a perspective view of a detail of the coupling means for connecting the framework of the ramp structure of the present invention to a truck body.

FIG. 8 shows the manner of loading a construction type vehicle having a loader attachment in front and a back hoe attachment at the rear onto the bed of a dump truck.

FIG. 9 shows the manner in which a construction type vehicle is carried in a bed of a dump truck with the apparatus of the present invention attached to the rear of the bed of the truck and a back hoe bucket resting on a portion of the ramp structure of the present invention provided for securing the bucket.

DESCRIPTION OF THE PREFERRED EMBODIMENT

With reference to FIG. 1, a ramp structure of the present invention is shown with a ramp member on the right hand side fully extended for loading a vehicle and a ramp member on the left hand side in a folded position, as the ramp structure is carried when being transported or stored. The ramp structure of the present invention utilizes a rigid framework 11 which has a forward side 13, of a length extending across the width of the bed of a truck, a rearward side 15 and left and right lateral sides, 17, 19, respectively. The four sides are generally rigid steel members with the sides welded together and made of beam type material for strength A first pair of parallel ramp members including the left ramp member 21 and the right ramp member 23 are of equal length and are supported between the forward framework side 13 and the rearward side 15. The ramp members are securely fastened in place, as by welding. The ramp members may either be solid or preferably have rungs as shown in the figure. Use of rungs may save weight, while providing increased strength over sheet steel of comparable weight.

The ramp members 21, 23 for a first pair of parallel members and each member is spaced apart from the opposite member a distance approximately equal to the tire separation distance of an auxiliary vehicle to be loaded on the bed of a dump truck or the like by means of the ramp of the present invention. That separation is such that the center of each wheel would approximately pass over the center of each ramp member.

Brackets 26, 27, 29, 31 are provided on opposite sides of each of the ramp members 21, 23 for attachment to forward side 13 of framework 11 and serve as a portion of coupling members for connection to a dump truck or similar vehicle.

Framework 11 further includes a rigid panel 33 which is connected to rearward side 15 of frame 11 at an acute angle to the lateral sides 17, 19 of the frame. Rigid panel 33 is centrally disposed between the first pair of ramp members 21, 23. Panel 33 serves to secure the bucket of a back hoe when a tractor with back hoe attachment is carried on the back of a dump truck.

A second pair of spaced apart, parallel ramp members 43, 45 are rigidly constructed to be of equal length and placed and hinged communication with the first pair of rmp members 23, 25. The hinge construction is such that the second pair of ramp members 43, 45 can come into substantial colinear alignment with the first pair of members as members 43, 23 as shown in FIG. 1. In this manner a wheeled vehicle can drive directly up the ramp structure of the present invention in a generally straight line.

The ramp structure of the present invention also includes a bracing means for steadying the framework 11 when it is being carried and when it is in position for loading vehicles from the ground. This bracing means consists of a pair of hinged arms 37, 39 which are hinged at points 41, 43 respectively, within the framework 11. Each support arm is carried in an upward position when the framework is not used for loading purposes such that the support arm 39 resides between a ramp member 23 and lateral side member 19. Support arm 39 may be a telescoping arm or may have any length adjustment for various types of terrain. When carried in a stored position between lateral side member 19 and ramp member 23, the ram 39 may be pinned in place, or otherwise secured in a storage position. The same construction is provided for the other support arm 37.

Another portion of the bracing means consists of a pair of beams 47, 49 extending forwardly from rigid panel 33 for abutment with under carriage members 51, 53 of a dump truck or similar vehicle.

FIG. 2 shows the details of the hinged connection between members of the first and second pairs of parallel ramp members. First ramp 23 is seen to be connected to the rear side 15 of framework 11 with the support arm 39 hinged between ramp member 23 and lateral side 19 by means of the hinged pin 43. A pair of mounts 55, 57 holds a fixed shaft 59 which is welded in place, after a rotatable joint 61 is positioned between mounts 55 and 57. Joint 61 is free to rotate about shaft 59. The joint 61 consists of parallel joint members 63, 65 which have a pair of opposed holes spaced apart from shaft 59 for allowing a second shaft 67 to pass there through for rotation. Shaft 67 is secured to a pair of lugs 69, 71 which is in turn connected to ramp member 43.

FIG. 3 shows a side view of the hinge construction described with reference to FIG. 2. It will be seen that the hinge construction allows the ramp members 43 and 19 to come in substantially linear alignment, although the alignment need not be perfect. The back 73 of joint 65 abuts the rear member of frame 15 keeping joint 65 from turning downwardly beyond the position shown in FIG. 3, thereby assisting and maintaining the parallel alignment between ramps. The horizontal position of joint 65 provides a flat step where a vehicle being loaded onto the bed of a truck may rest before moving completely onto a bed of a truck. The step serves to notify a driver of an auxiliary vehicle being loaded onto the back of a dump truck of his wheel position on the ramp. The step also makes it easier for an auxiliary vehicle to travel over the rear side 15 of the ramp structure.

FIG. 4 shows the motion of the ramp member 43 and of joint 65 when ramp member 43 is folded over the ramp member 19. Also visible in this figure is the back 73 of joint 65 which abuts rearward side 15 of the framework 11.

FIG. 5 demonstrates the special utility of the unitary construction of the present ramp when used with construction type vehicles, such as back hoes which may easily pick up the framework 11. Chains C each have a first end secured to the upper side of loader hoe bucket B and a lower side to a portion of the first pair of ramp members 21, 23. Bucket B is used to lift the framework 11 and bring the forward side 13 against a corresponding backing plate stretched across the rear of the bed of a dump truck and slightly below it. The bucket B is then lowered until the rails 47, 49 come into contact with the undercarriage of the dump truck.

This is more clearly illustrated in FIG. 6 where the bucket B is seen to moving the framework 11 in the direction indicated by the arrow A. The forward side 13 of structure 11 is aligned with the hook members 77, 79, 81 which are disposed on plate at the end and slightly below the bed of a dump truck D. Beams 47, 49 seem to extend forwardly of the plate 33 in a generally coplanar relationship therewith. Beams 47, 49 are allowed to abut the undercarriage members 51, 53 of dump truck D and brace and structure 11 against the truck when the structure is coupled to the truck by means of coupling members including hooks 77, 79 and 81. These hooks are mounted to a lip member 83 which extends across the rear of the truck bed slightly below the body thereof.

In FIG. 7 the coupling means of the present invention is illustrated in detail. The lip member 83 which is secured to a truck body slightly below the bed has a plurality of first coupling members, namely the hooks which were previously identified of which hook 77 is one. A plurality of second coupling members, such as the bracket 31 is attached to the forward side of framework 11 secured to a ramp member, such as ramp 23. The bracket has provisions for insertion of a pin through the bracket and through the hook, i.e. through both first and second coupling members, interlocking both in place such that the ramp structure 11 cannot be uncoupled from the truck without removing the pin 85.

The pin 85 is provided primarily as a safety feature to foreclose any risk of the ramp structure uncoupled from the truck body. It is expected that the pin is not needed because the very heavy weight of the ramp structure is deemed sufficient to keep it in place.

FIG. 8 illustrates operation of the invention of the present invention. A tractor T is being loaded onto the dump truck D. The rear tire of the tractor T is seen to have traveled up the ramp member 43 but has not yet traversed ramp member 23. The tire is resting on joint 65 of hinge member 61. The ramp structure 11 is seen to be held in place by the bracing means which includes the support arm 39 which provides upward thrust against loads such as tractor T on the ramp members 43 and 23 and is further braced by platform 33 and the beam member 49 extending forwardly therefrom abutting against the undercarriage of truck D.

In FIG. 9 the tractor T has been fully loaded aboard the dump truck D and the lower ramp member 43 has been folded over the ramp member 23 which is held within framework 11. The back hoe bucket E is placed on rigid panel 33 to hold bucket E in place and provide support for it so that the tractor T will not have a tendency to tilt back and out of the dump truck E.

The following table indicates the dimensions of framework 11 and is merely exemplary. These dimensions are not critical and those skilled in the art may invision other dimensions which are still within the meaning and spirit of the present invention.

TABLE 1

| Dimensions of Framework 11 (In Inches) | |
| --- | --- |
| Length of lateral sides 17,19 | 60" |
| Length of forward and rearward sides 13,15 | 96" |
| Length of second ramp members 43,45 | 60" |
| Length of support arms 37,39 | 24" |
| Width of second ramp members 43,45 | 21" |
| Width of first ramp members 23,25 | 22" |

The above table in referring to the length of forward side 13 does not include the slight amount of overhang beyond the lateral sides 17, 19 of framework 11. In connection with FIG. 5, it may be seen that holes 26, 28, 30, 32 are defined within the lateral side 13 for entry of hook members 77, 79, 81 shown in FIG. 6, plus a fourth hook member, not shown in FIG. 6. FIG. 1 illustrates how the hook members penetrate the forward side 13 and fit into brackets 26, 27, 29, and 31. The detailed cooperation between the coupling members is illustrated in FIG. 7.

I claim:

1. A ramp structure for trucks having beds of a size for hauling auxiliary vehicles comprising,
   a rigid framework having forward, rearward and lateral sides, and having a first pair of parallel ramp members of equal length extending from the forward to the rearward sides of said framework and spaced spart a distance equal to the tire separation distance of auxiliary vehicles,
   a second pair of spaced apart, parallel ramp members of equal length, each in communication with one of said first pair of ramp members near the rearward side of said framework for coming into alignment with said first pair of ramp members in one position and overlapping said first pair in another position,
   means connected to said framework for detachably coupling said framework to a truck body, and
   bracing means extending between said framework and the truck body for steadying said framework against the truck body when said framework is coupled thereto, whereby said framework is coupled to and braced against a truck body for movement therewith.

2. The apparatus of claim 1 wherein said bracing means comprises a rigid panel connected to the rearward side of said frame at an acute angle to the lateral sides of the frame, said rigid panel being centrally disposed between said first pair of ramp members and a pair of beams forwardly extending from said rigid panel for abutment with an undercarriage member of said truck.

3. The apparatus of claim 2 wherein said bracing means further comprises a pair of hinged support arms, each arm hinged to said framework and having a length for extending from said corner to ground level when said framework is coupled to a truck body.

4. The apparatus of claim 1 wherein said means for coupling said framework to a truck body comprises,
   a lip member mounted at the rear of a truck body, said truck body having a bed, said lip member mounted below the bed, said lip member having a plurality of first coupling members and
   a plurality of second coupling members attached to the forward side of said framework corresponding in number and position to said first coupling members for engagement therewith.

5. The apparatus of claim 4 wherein said first coupling members are hooks and wherein said second coupling members are brackets mounted in said forward side of said framework for engagement with said hooks.

6. The apparatus of claim 5 wherein said brackets are provided with a removable pin for securing said hook members in position.

7. The apparatus of claim 1 wherein the forward side of said rigid framework is of a dimension extending entirely across the rear edge of the bed of a truck to which said framework is coupled.

8. The apparatus of claim 1 wherein the length of said second pair of parallel ramp members is not greater than said first pair of ramp members.

9. A truck body comprising,
   a rectangular bed of a size for hauling auxiliary vehicles, said bed having an undercarriage and a downwardly extending lip member disposed at a rear edge of the bed, said lip member having a plurality of first coupling members,
   a rigid framework having forward, rearward and lateral sides, and having a first pair of parallel ramp members of equal length extending from the forward to the rearward sides of said framework and spaced apart a distance equal to the tire separation distance of auxiliary vehicles,
   a second pair of spaced apart, parallel ramp members of equal length, each in communication with one of said first pair of ramp members near the rearward side of said framework for coming into alignment with said first pair of ramp members in one position and extending over said first pair in another position,
   a plurality of second coupling members attached to the forward side of said framework corresponding in number and position to said first coupling members and in removable engagement therewith, and
   fixed beam means communicating with said rigid framework and extending forwardly with respect thereto for abutment with said undercarriage.

10. The apparatus of claim 9 wherein a rigid panel is connected to the rearward side of said frame at an acute angle to the lateral sides of the frame, extending toward said undercarriage, said rigid panel being centrally disposed between said first pair of ramp members.

11. A ramp structure for trucks having beds of a size for hauling auxiliary vehicles comprising, a rigid framework having forward, rearward and lateral sides, and having a first pair of parallel ramp members of equal length extending from the forward to the rearward sides of said framework and spaced apart a distance equal to the tire separation distance of auxiliary vehicles, a second pair of spaced apart, parallel ramp members of equal length, each in communication with one of said first pair of ramp members near the rearward side of said framework for coming into alignment with said first pair of ramp members in one position and overlapping said first pair in another position, means for detachably coupling said framework to a truck body, and bracing means for steadying said framework, said bracing means comprising a rigid panel connected to the rearward side of said frame at an acute angle to the lateral sides of the frame, said rigid panel being centrally disposed between said first pair of ramp members, for supporting a portion of an auxiliary vehicle, and a pair of beam means forwardly extending from said rigid panel for abutment with an undercarriage of said truck for supporting said framework when said truck is in motion.

* * * * *